United States Patent
Nakamura et al.

(10) Patent No.: US 11,909,954 B2
(45) Date of Patent: Feb. 20, 2024

(54) DECODING APPARATUS, ENCODING APPARATUS, DECODING METHOD, ENCODING METHOD, AND PROGRAM

(71) Applicant: Nippon Telegraph and Telephone Corporation, Tokyo (JP)

(72) Inventors: Ken Nakamura, Tokyo (JP); Hiroe Iwasaki, Tokyo (JP); Takayuki Onishi, Tokyo (JP); Daisuke Kobayashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 194 days.

(21) Appl. No.: 17/283,213

(22) PCT Filed: Oct. 10, 2019

(86) PCT No.: PCT/JP2019/040037
§ 371 (c)(1),
(2) Date: Apr. 6, 2021

(87) PCT Pub. No.: WO2020/090408
PCT Pub. Date: May 7, 2020

(65) Prior Publication Data
US 2021/0385434 A1 Dec. 9, 2021

(30) Foreign Application Priority Data
Oct. 31, 2018 (JP) .................................. 2018-204968

(51) Int. Cl.
*H04N 19/174* (2014.01)
*H04N 19/159* (2014.01)
(Continued)

(52) U.S. Cl.
CPC ......... *H04N 19/105* (2014.11); *H04N 19/159* (2014.11); *H04N 19/174* (2014.11); *H04N 19/46* (2014.11)

(58) Field of Classification Search
CPC .. H04N 19/105; H04N 19/159; H04N 19/174; H04N 19/46
(Continued)

(56) References Cited

U.S. PATENT DOCUMENTS 8,923,388 B2 * 12/2014 Sezer .................... H04N 19/50
375/240.12
2014/0072030 A1 * 3/2014 Zhou .................... H04N 19/15
375/240.01
(Continued)

FOREIGN PATENT DOCUMENTS

| JP | 3961654 | 8/2007 |
|---|---|---|
| JP | 6080375 | 2/2017 |

(Continued)

OTHER PUBLICATIONS

Ntt.co.jp, [online], "Developed the world's highest performance 8K HEVC real-time encoder with a dedicated LSI ~Realizes high-quality 8K video transmission with a sense of reality at 85 Mbps," Feb. 2016, retrieved on Sep. 20, 2018, retrieved from URL<http://www.ntt.co.jp/news2016/1602/160215b.html>, 9 pages (with English Translation).

*Primary Examiner* — Albert Kir
(74) *Attorney, Agent, or Firm* — Fish & Richardson P.C.

(57) ABSTRACT

In a decoding apparatus configured to perform decoding processing in parallel using N arithmetic decoding units and M image decoding units on a plurality of slices, each slice being composed of at least one encoding block line, the N arithmetic decoding units start arithmetic decoding processing in sequence at time intervals corresponding to slice sizes on a stream that satisfies a condition that a difference
(Continued)

between a total number of encoding block lines included in any N consecutive slices and a total number of encoding block lines included in N consecutive slices different from the any N consecutive slices is 1 or less, and a condition that a code amount of each slice is less than a predetermined upper limit code amount.

9 Claims, 6 Drawing Sheets

(51) Int. Cl.
    *H04N 19/105* (2014.01)
    *H04N 19/46* (2014.01)
(58) Field of Classification Search
    USPC ................................................ 375/240.02
    See application file for complete search history.

(56) References Cited

U.S. PATENT DOCUMENTS

| 2014/0086305 | A1* | 3/2014 | Esenlik | H04N 19/17 |
| | | | | 375/240.02 |
| 2014/0334538 | A1 | 11/2014 | Okawa | |
| 2016/0241854 | A1* | 8/2016 | Cheng | H04N 19/91 |
| 2018/0020228 | A1* | 1/2018 | Wu | H04N 19/91 |
| 2020/0145664 | A1* | 5/2020 | Dinu | H04N 19/13 |

FOREIGN PATENT DOCUMENTS

| WO | WO-2013010997 A1 * | 1/2013 | G06T 9/00 |
| WO | WO-2019185821 A1 * | 10/2019 | H04N 19/105 |
| WO | WO-2020210511 A1 * | 10/2020 | H04N 19/174 |
| WO | WO-2020226930 A1 * | 11/2020 | H04N 19/13 |

* cited by examiner

DECODING APPARATUS, ENCODING APPARATUS, DECODING METHOD, ENCODING METHOD, AND PROGRAM

CROSS-REFERENCE TO RELATED APPLICATIONS

This application is a National Stage application under 35 U.S.C. § 371 of International Application No. PCT/JP2019/040037, having an International Filing Date of Oct. 10, 2019, which claims priority to Japanese Application Serial No. 2018-204968, filed on Oct. 31, 2018. The disclosure of the prior application is considered part of the disclosure of this application, and is incorporated in its entirety into this application.

TECHNICAL FIELD

The present invention relates to a decoding apparatus, an encoding apparatus, a decoding method, an encoding method, and a program.

BACKGROUND ART

Reducing delay in processing has been a significant problem in encoding apparatuses (encoders) and decoding apparatuses (decoders) based on international standards for image encoding. International standards for image encoding are, for example, H.265 (ISO/IEC 23008-2 HEVC (High Efficiency Video Coding)) (hereinafter referred to as "HEVC"), and H.264 (ISO/IEC 14496-10 MPEG4-AVC (Moving Picture Experts Group 4-Advanced Video Coding) (hereinafter referred to as "H.264"). Recently, parallelization of processing has been essential for realizing encoding apparatuses and decoding apparatuses with high processing capabilities that enable reduction of delay in processing.

Conventionally, there has been a technique in which an improvement in the processing speed is achieved by dividing an input stream into multiple slices, distributing the divided slices to multiple decoding circuits prepared in advance, and performing decoding processing in parallel (e.g., PTL 1). Also, a method has been known in which decoding processing is divided into arithmetic decoding processing and image decoding processing. In arithmetic decoding processing, the input stream is decoded into encoded data, which is a binary data string, using arithmetic decoding. In image decoding processing, a decoded image is generated by performing predicted image generation through motion compensation, and decoding processing of a predicted residual signal on the encoded data.

For reasons relating to standards such as HEVC and H.264, in the arithmetic decoding processing, parallelization within a slice is difficult, and therefore parallelization processing is generally performed in units of slices. On the other hand, in image decoding processing, a method is generally known in which parallel processing is performed while delaying processing in units of encoding block lines with consideration given to a dependence relationship of processing between encoding blocks (e.g., PTL 2). An encoding block in this context corresponds to a CTU (Coding Tree Unit) in HEVC and corresponds to an MB (Macro Block) in H.264. Also, an encoding block line in this context means a row of blocks at the same vertical position in a screen.

In HEVC, a WPP (Wave-front Parallel Processing) mode in which consideration is given to parallelization of arithmetic decoding processing in units of encoding block lines (CTU lines) is standardized. In the WPP mode, it is possible to perform arithmetic decoding processing in parallel in units of encoding block lines within slices as well, and if decoding up to the second CTU in one line has ended, decoding of that encoding block line can be started.

CITATION LIST

Patent Literature

[PTL 1] Japanese Patent No. 3961654
[PTL 2] Japanese Patent No. 6080375

Non-Patent Literature

[NPL 1] NTT Corporation News Release, "NTT develops the world's best performance 8K HEVC real-time encoder through dedicated LSI use—enabling immersive high-quality 8K video transmission at 85 Mbps", [online], Feb. 15, 2016, Nippon Telegraph and Telephone Corporation, [searched for on Oct. 30, 2018], Internet <URL: http://www.ntt.co.jp/news2016/1602/160215b.html>

SUMMARY OF THE INVENTION

Technical Problem

However, in the standard, the number of slice divisions in the image and the division size are unclear at the time when the head portion of the input stream is received. Furthermore, it is also unclear whether or not the image has been divided into multiple slices in the first place. For this reason, it is necessary to perform decoding processing with consideration given to the possibility that the image has not been divided into multiple slices. In general arithmetic decoding processing, for example, if one image is composed of one slice, the decoding processing can only be parallelized in units of images. For this reason, there is a problem in that it is difficult to achieve a reduction in the delay of decoding processing.

Also, although the above-described WPP mode gives consideration to parallelization of arithmetic decoding processing in units of encoding block lines, there is a problem in that it is difficult to implement if parallel encoding is performed using a spatial division scheme in the encoding apparatus. In particular, a hardware encoder with a multiple-module configuration is often used in an encoding apparatus that requires a high processing capability. In this configuration, the WPP mode often cannot be used since parallel encoding through a loosely-coupled spatial division scheme is often employed. Also, in the above-described WPP mode, in the standard, a reference range of a motion vector (MV) cannot be limited beforehand in image decoding processing. For this reason, the first encoding block line in the image cannot be decoded until after the decoding of all of the encoding block lines in the previous image is complete. Accordingly, there is a problem in that the degree of parallelization of the decoding processing decreases, and therefore it is difficult to achieve reduction of delay in decoding processing.

The present invention was made in view of these circumstances, and aims to provide a technique according to which it is possible to reduce delay in decoding processing.

Means for Solving the Problem

One aspect of the present invention is a decoding apparatus configured to perform decoding processing in parallel using N arithmetic decoding units and M image decoding units on a plurality of slices obtained by dividing an image, each slice being composed of at least one encoding block line, in which the N arithmetic decoding units start arithmetic decoding processing in sequence at time intervals corresponding to slice sizes on a stream that satisfies a condition that a difference between a total number of encoding block lines included in any N consecutive slices and a total number of encoding block lines included in N consecutive slices different from the any N consecutive slices is 1 or less, and a condition that a code amount of each slice is less than a predetermined upper limit code amount.

Also, one aspect of the present invention is the above-described decoding apparatus, in which if processing is possible after acquiring head portions of slices, the arithmetic decoding units start arithmetic decoding processing on a stream resulting from performing code amount control in units of slices on an image stored in a buffer of a size that is the same as the upper limit code amount.

Also, one aspect of the present invention is the above-described decoding apparatus, further including a control unit configured to, according to the size of the upper limit code amount, determine an amount of time from a start time of arithmetic decoding processing of a first slice in an image to a start time of image decoding processing of a first encoding block line of the slice.

Also, one aspect of the present invention is the above-described decoding apparatus, in which if a condition that, in inter-encoding of an X-th encoding block line from an upper edge of an image, an (M–X)-th encoding block line from a lower edge of a reference image that was encoded immediately previously is not referenced is satisfied, the M image decoding units start image decoding processing in sequence at a predetermined time interval on the encoding block lines.

Also, one aspect of the present invention is the above-described decoding apparatus, further including a control unit configured to identify a value of a flag included in the encoding block line and determine whether or not to perform the decoding processing based on the value of the flag.

Also, one aspect of the present invention is an encoding apparatus including configured to generate a stream that is encoded so as to satisfy at least a first condition and a second condition among a first condition that a difference between a total number of encoding block lines included in any N consecutive slices and a total number of encoding block lines included in N consecutive slices different from the any N consecutive slices is 1 or less, a second condition that a code amount of each slice is less than a predetermined upper limit code amount, and a third condition that, in inter-encoding of an X-th encoding block line from an upper edge of an image, an (M–X)-th encoding block line from a lower edge of a reference image that was encoded immediately previously is not referenced, and to add a flag indicating that at least the first condition and the second condition are satisfied to the stream.

Also, one aspect of the present invention is a decoding method for performing decoding processing in parallel using N arithmetic decoding units and M image decoding units on a plurality of slices obtained by dividing an image, each slice being composed of at least one encoding block line, the decoding method including a step in which the N arithmetic decoding units start arithmetic decoding processing in sequence at time intervals corresponding to slice sizes on a stream that satisfies a condition that a difference between a total number of encoding block lines included in any N consecutive slices and a total number of encoding block lines included in N consecutive slices different from the any N consecutive slices is 1 or less, and a condition that a code amount of each slice is less than a predetermined upper limit code amount.

Also, one aspect of the present invention is an encoding method including generating a stream that is encoded so as to satisfy at least a first condition and a second condition among a first condition that a difference between a total number of encoding block lines included in any N consecutive slices and a total number of encoding block lines included in N consecutive slices different from the any N consecutive slices is 1 or less, a second condition that a code amount of each slice is less than a predetermined upper limit code amount, and a third condition that, in inter-encoding of an X-th encoding block line from an upper edge of an image, an (M–X)-th encoding block line from a lower edge of a reference image that was encoded immediately previously is not referenced, and adding a flag indicating that at least the first condition and the second condition are satisfied to the stream.

Also, one aspect of the present invention is a program for causing a computer to function as the above-described decoding apparatus or the above-described encoding apparatus.

Effects of the Invention

According to the present invention, it is possible to reduce delay in decoding processing.

DESCRIPTION OF EMBODIMENTS

First Embodiment

Hereinafter, a first embodiment of the present invention will be described with reference to the drawings.

Hereinafter, an image decoding apparatus 1 and an image encoding apparatus 2 according to the present embodiment will be described.

Figure 1:
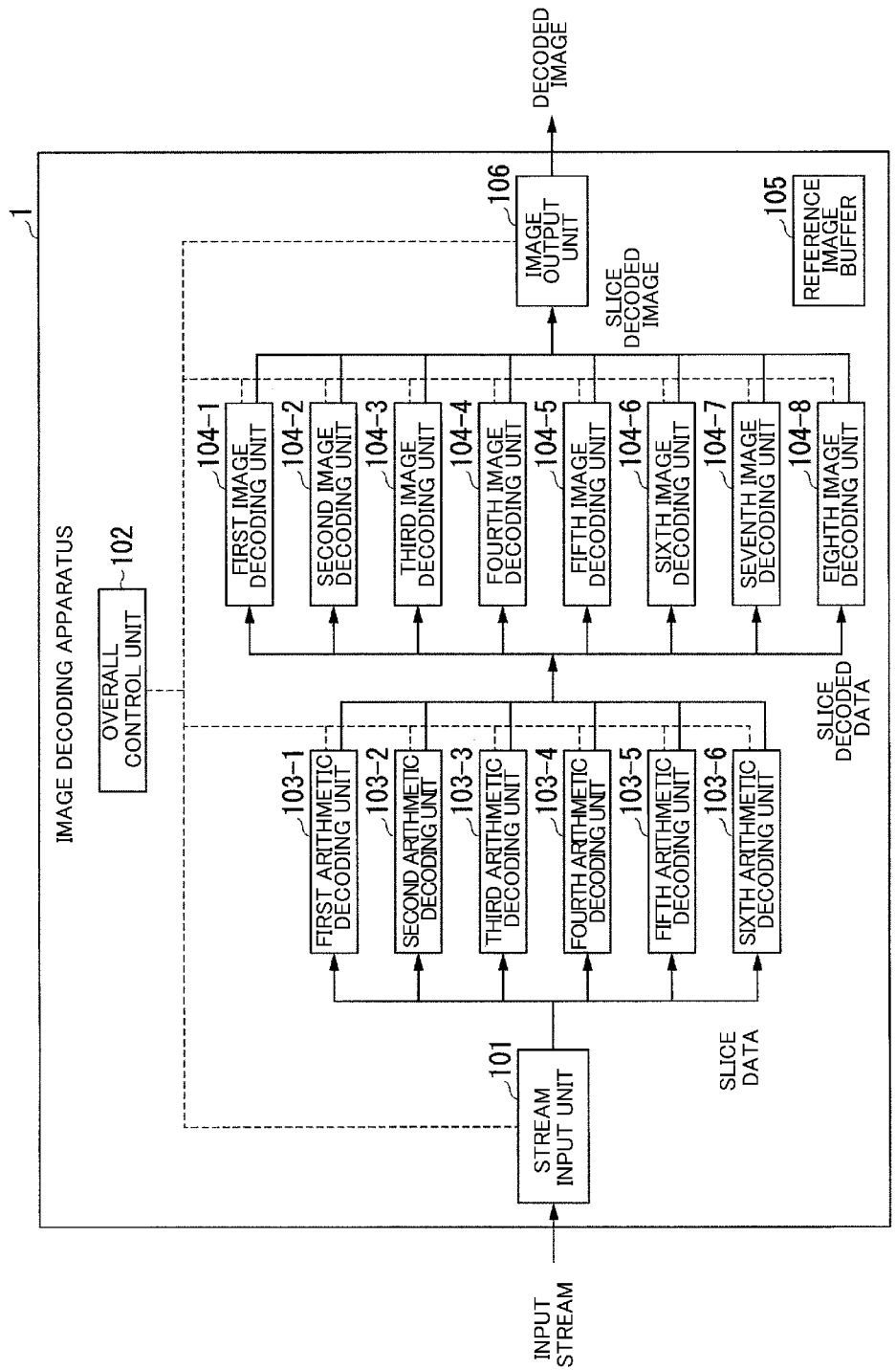
FIG. 1 is a block diagram showing a functional configuration of an image decoding apparatus 1 according to a first embodiment of the present invention.
Figure 2:
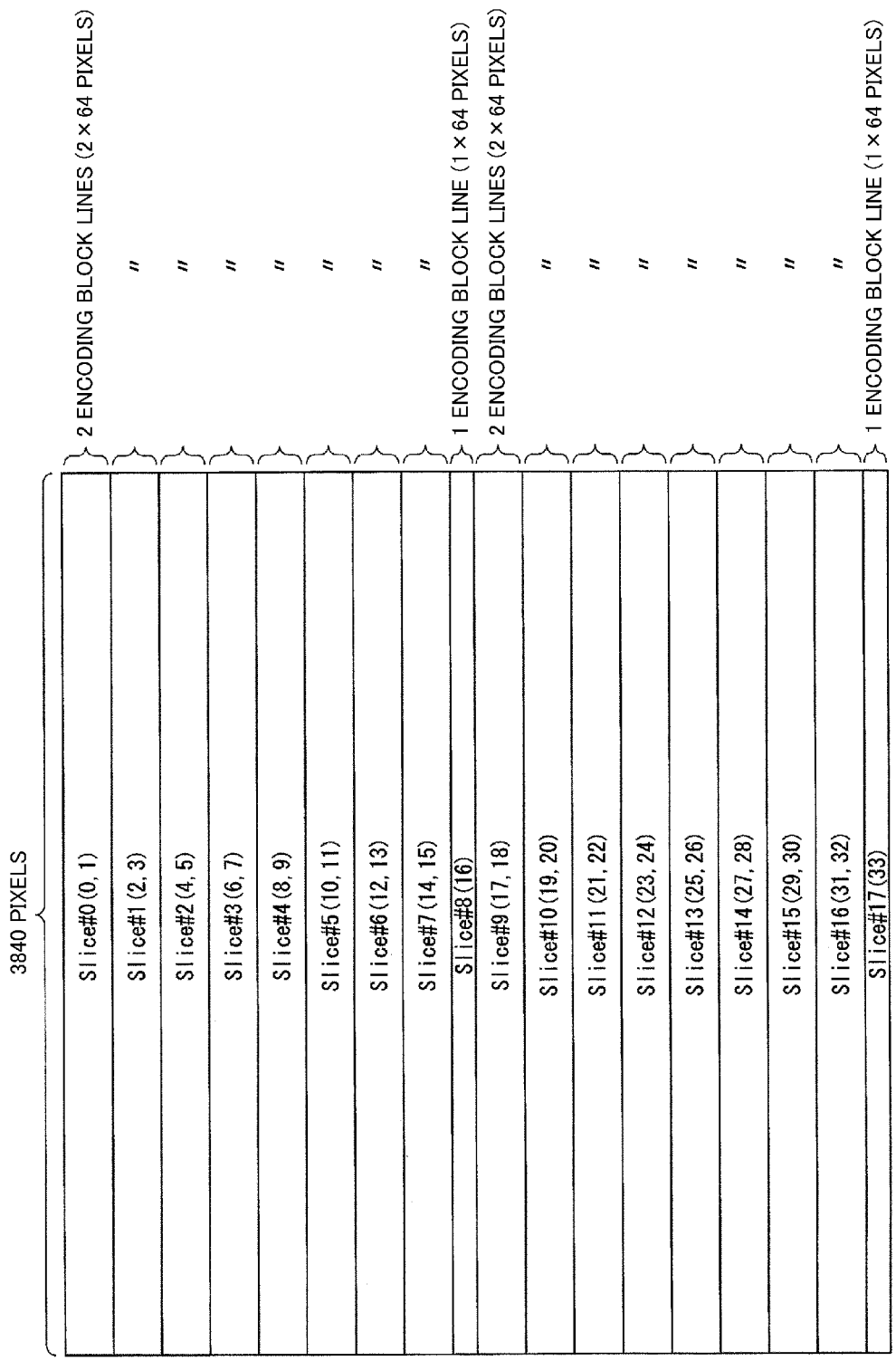
FIG. 2 is a diagram showing an example of a slice division pattern in the first embodiment of the present invention.
Figure 3:
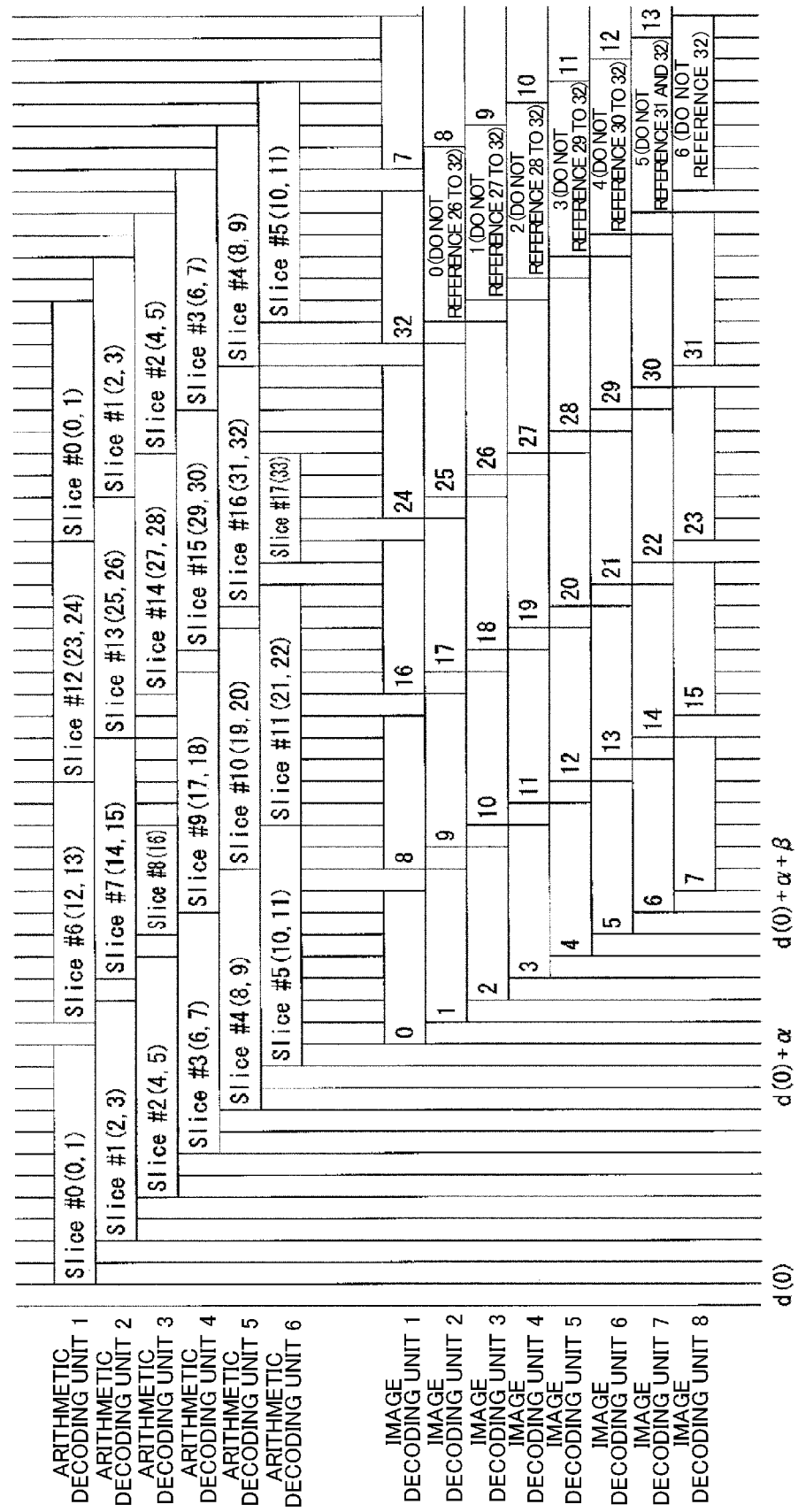
FIG. 3 is a diagram showing an example of execution timing of arithmetic decoding processing and image decoding processing in the first embodiment of the present invention.

FIG. 1 is a block diagram showing a functional configuration of an image decoding apparatus 1 according to the first embodiment of the present invention. Also, FIG. 2 is a diagram showing an example of a slice division pattern in the first embodiment of the present invention. Also, FIG. 3 is a diagram showing an example of execution timings of arithmetic decoding processing and image decoding processing in the first embodiment of the present invention.

The image encoding apparatus 2 performs encoding processing (encoding) on an input stream composed of multiple slices obtained by dividing one image, so as to satisfy the following three predetermined conditions (hereinafter referred to as "restricting conditions"). In contrast to this, the image decoding apparatus 1 performs decoding processing (decoding) in which delay is reduced by increasing the usage efficiency of the processing units included in the image decoding apparatus 1 when the following restricting conditions are satisfied. Note that the restricting conditions are conditions relating to the slice division pattern, the generated code amount, and the motion vector reference range.

First Condition

That if each slice is composed of one or more encoding block lines and the number of later-described parallel arithmetic decoding units 103 is N, the difference between the total number of encoding block lines of any N consecutive slices and the total number of encoding block lines of other N consecutive slices is 1 or less (that is, 1 or 0).

Second Condition

That the code amount is controlled such that the amount of time needed for arithmetic decoding processing of each slice or the sum of the arrival delay time and the amount of time needed for arithmetic decoding processing of each slice falls within a predetermined amount of time.

Third Condition

That, if the number of later-described parallel image decoding units 104 is M, the X-th (X<M) encoding block line from the top does not reference the decoded images from the (M−X)-th encoding block line from the bottom to the lowermost encoding block line.

The image decoding apparatus 1 immediately starts the arithmetic decoding processing performed by the arithmetic decoding units 103 and the image decoding processing performed by the image decoding units 104 for an input stream that satisfies the above-described restricting conditions. Accordingly, reduction of delay in the decoding processing is achieved.

First, in the first condition, the number of slices is set to a number that is an integer multiple of the number of encoding block lines, whereby the amount of waiting time until the start of processing is shortened in the image decoding units 104 that perform image decoding processing in parallel in units of encoding block lines after arithmetic decoding. Also, if the arithmetic decoding units 103 are to perform arithmetic decoding processing in parallel on a received slice, the arithmetic decoding units 103 each perform the arithmetic decoding processing on a certain slice, and thereafter, a slice that is N slices away is subsequently subjected to the arithmetic decoding processing by the arithmetic decoding unit 103. For this reason, if the total number of encoding block lines of any N slices is constant, the number of encoding block lines that are processed by each arithmetic decoding unit 103 and the processing times become uniform, and therefore the decoding efficiency is optimal.

However, in actuality, the above-described restricting conditions cannot be satisfied unless all slices are divided to the same size, and depending on the image size, it is not possible to divide all of the slices to the same size. For this reason, it is assumed that a difference corresponding to one encoding block line is allowed, and the difference between the total number of encoding block lines of any N consecutive slices and the total number of encoding block lines of other N consecutive slices is 1 or less.

If encoding of each slice is started at a time interval corresponding to the slice size (e.g., proportional to the slice size) by each later-described arithmetic encoding unit 206 of the image encoding apparatus 2, the amount of time until the start of encoding of the next slice is (A−1)/P/L [seconds], or A/P/L [seconds]. Here, A and A−1 indicate the total number of encoding block lines of any N consecutive slices. Also, P indicates the frame rate [frames/second]. Also, L indicates the number of encoding block lines in the image.

Condition 2 is a condition that the generated code amount of each slice is controlled such that the arithmetic decoding processing ends with (A−1)/P/L [seconds], which is the shorter amount of time among amounts of time until the start of encoding of the next slice, as the upper limit time amount.

Letting Rmax be the overall maximum throughput of the arithmetic decoding units 103 (i.e., the maximum bit rate that can be stably decoded without relying on the content of the stream) and Rmax/N be the maximum throughput of each arithmetic decoding unit 103, the maximum upper limit code amount Tmax [bits] of the slice will be as shown in Formula (1) below.

$$T\max = R\max *(A-1)/N/P/L \quad (1)$$

Here, if the encoding bit rate is low and it is clear at the start of decoding that the upper limit code amount of the slices is less than the above-described slice maximum upper limit code amount Tmax based on the CPB (Coded Picture Buffer) size and the like described in the stream, the decoding delay can be reduced by accordingly making the processing start time of the image decoding units 104 earlier. Also, under the condition of the predetermined encoding bit rate, the processing start time of the image decoding units 104 can also be made even earlier by determining based on the CPB size that the sum of the arrival delay time of the head portion of the slice and the amount of time needed for arithmetic decoding is less than or equal to a predetermined amount of time.

Condition 3 is a restricting condition in the case of using inter-encoding. For this reason, Condition 3 is not needed in the case of an encoding mode in which all encoding is performed using I-picture coding. Each image decoding unit 104 accumulates reference images, which are decoded images of each slice, in a later-described reference image buffer 105. In decoding of an inter-encoded block of a subsequent slice, each image decoding unit 104 acquires the reference image that was encoded immediately previously from the reference image buffer 105 according to the motion vector.

If the number of image decoding units 104 is M, the image decoding processing is performed on a certain slice, and thereafter a slice that is M slices away is subsequently subjected to image decoding processing in the same image decoding unit 104. Here, since decoding is not complete for slices of the previous image that are not M slices or more away, referencing of those slices needs to be prohibited. Due to this condition, even between images, decoding processing of each slice can be started at a uniform time interval. Accordingly, reduction of delay in the decoding processing is achieved.

The image encoding apparatus 2 implements encoding control so as to satisfy the above-described restricting conditions. Also, the image encoding apparatus 2 describes (adds) a flag indicating whether or not reduced-delay decoding is enabled (hereinafter referred to as a "delay reduction flag") in a user data region or an unused region in the input stream. If the above-described restricting conditions are satisfied, the image encoding apparatus 2 describes a value indicating that reduced-delay decoding is enabled as the delay reduction flag. Also, if the above-described restricting conditions are not satisfied, the image encoding apparatus 2 describes a value indicating that reduced-delay decoding is disabled as the delay reduction flag.

Hereinafter, a case in which the value indicating that performing reduced-delay decoding processing is enabled has been described as the delay reduction flag will be referred to as "the delay reduction flag being enabled". Also, hereinafter, a case in which the value indicating that performing reduced-delay decoding processing is disabled has been described as the delay reduction flag will be referred to as "the delay reduction flag being disabled".

The image decoding apparatus 1 identifies the delay reduction flag described in the user data region or the unused region in the input stream. If the delay reduction flag is enabled, the image decoding apparatus 1 performs the above-described reduced-delay decoding processing. According to this delay reduction flag, the image encoding apparatus 2 and the image decoding apparatus 1 can also be allowed to perform normal (without reduced delay) encoding processing and decoding processing if the restricting conditions are not satisfied. For this reason, by providing the delay reduction flag, it is possible to form the image encoding apparatus 2 and the image decoding apparatus 1 as general-purpose apparatuses.

Also, it is assumed that information relating to the number (N; in FIG. 1, N=6) of parallel arithmetic decoding units 103, the number (M; in FIG. 1, M=8) of parallel image decoding units 104, the overall throughput of the arithmetic decoding units 103 (Rmax), and the slice division pattern have been shared in advance between the image encoding apparatus 2 and the image decoding apparatus 1. Note that the image encoding apparatus 2 and the image decoding apparatus 1 may also have shared the above-described multiple types of information. In this case, the image decoding apparatus 1 can also perform decoding processing by switching the operation among multiple types of operations based on the value of the delay reduction flag, by enabling the type to be determined according to the value of the delay reduction flag.

Configuration of Image Decoding Apparatus

Hereinafter, the configuration of the image decoding apparatus 1 will be described.

As shown in FIG. 1, the image decoding apparatus 1 is constituted by including a stream input unit 101, six arithmetic decoding units (first arithmetic decoding unit 103-1, second arithmetic decoding unit 103-2, . . . , sixth arithmetic decoding unit 103-6), eight image decoding units (first image decoding unit 104-1, second image decoding unit 104-2, . . . , eighth image decoding unit 104-8), a reference image buffer 105, and an image output unit 106.

Note that in the following description, if there is no need to distinguish between the first arithmetic decoding unit 103-1, the second arithmetic decoding unit 103-2, . . . , and the sixth arithmetic decoding unit 103-6, they will be referred to as "arithmetic decoding units 103". Also, in the following description, if there is no need to distinguish between the first image decoding unit 104-1, the second image decoding unit 104-2, . . . , and the eighth image decoding unit 104-8, they will be referred to as "image decoding units 104".

Note that in the present embodiment, although it was assumed that the numbers of the arithmetic decoding units 103 and the image decoding units 104 are six and eight respectively, there is no limitation to this. Any number can be used as long as there are multiple arithmetic decoding units 103 and image decoding units 104.

The stream input unit 101 receives input of the input stream output by the image encoding apparatus 2. The stream input unit 101 analyzes the input stream and acquires the value of the delay reduction flag that is defined in the user data region or the unused region included in the input stream.

An overall control unit 102 determines whether the delay reduction flag is enabled or disabled.

If the delay reduction flag is disabled, the overall control unit 102 stops the decoding processing, and if the delay reduction flag is enabled, the overall control unit 102 causes the functional units to execute the later-described reduced-delay decoding processing.

Note that if the delay reduction flag is disabled, the overall control unit 102 may also cause the functional units to execute the normal (without reduced delay) decoding processing.

Next, upon receiving the stream of the head portion of the image on which decoding can be started, the stream input unit 101 acquires the decoding start time of the image. For example, if MPEG-2 TS (Transport Stream) (H.222, ISO/IEC13818-1) is used, the decoding start time corresponds to the value of the DTS (Decoding Time Stamp) of the PES (Packetized Elementary Stream) header. Based on a reference time of an STC or the like that can be separately reproduced and referenced, when the decoding start time is reached, the first arithmetic decoding unit 103-1 starts the arithmetic decoding processing of slice 0, which is the first slice. Thereafter, the second arithmetic decoding unit 103-2 to the sixth arithmetic decoding unit 103-6 start the arithmetic decoding processing of the slices in the order in which the slices are received.

The decoding start time d(n) of slice n, which is the n-th slice from the start of decoding, is calculated according to Formula (2) below.

$$d(n)=1/L/P+D(n) \quad (2)$$

Here, P indicates the frame rate (frames/second). Also, L indicates the number of encoding block lines (CTU lines) per image. Also, l (l=0 to L−1) indicates the head encoding block line of the slice. Also, D(n) indicates the decoding start time of the image to which the slice belongs.

Arithmetic decoding processing is started at the time d(n) by the (n %6)+1-th arithmetic decoding unit (e.g., if n=1, the second arithmetic decoding unit 103-2) on the slice n.

If the restriction relating to the slice division size (the first condition above) and the restriction relating to the slice code amount (the second condition above) are satisfied, arithmetic decoding processing can be completed by any of the arithmetic decoding units 103 before the decoding start time of a subsequent slice. Also, before the time d(n)+α, the arithmetic decoding units 103 complete the arithmetic decoding processing of the slice n, and the subsequent image decoding units 104 can start the image decoding processing.

Here, if it is understood that the code amount of a slice is definitely T or less based on the CPB (Coded Picture Buffer) size and the like in the stream, α above may also be changed to T/Tmax*α, which is based on the slice upper limit code amount Tmax of the above-described image decoding apparatus 1. Accordingly, it is possible to achieve further reduction of delay.

The image decoding units 104 perform image decoding processing in units of encoding block lines. The image decoding units 104 perform image decoding processing with consideration given to the dependence relationship in the HEVC image decoding processing. Specifically, the image decoding units 104 execute the image decoding processing on the lower encoding block lines by delaying by an amount of time corresponding to the input time of one encoding block line from the execution time of the image decoding processing performed on the upper encoding block lines, such that the decoding of the next CTU is performed after the decoding of the CTU located above and to the right is complete.

Each image decoding unit 104 can reference a common reference image buffer 105. Also, if HEVC is used, the decoded images that have been decoded are accumulated in the reference image buffer 105 in accordance with the stipulations of DPB (Decoding Picture Buffer).

If the restriction relating to the reference range for motion compensation (the third condition above) is satisfied, the image decoding unit 104 does not require the decoded image of the bottom end of an image when decoding the encoding block line of the upper end of an image. For this reason, the image decoding unit 104 can start the decoding of the encoding block line of the upper end of a subsequent image before the decoding of the encoding block line of the lower end of the image ends.

The image decoding processing in units of encoding block lines ends within a certain amount of time. The decoded image of slice n is input to the image output unit 106 before the time $d(n)+\alpha+\beta$. The image output unit 106 shapes and converts the input decoded image of the slice n in accordance with a predetermined image format such as SDI format, and then outputs the result as a decoded image.

According to the above-described configuration, the image decoding apparatus 1 does not generate extra waiting time in the arithmetic decoding units 103 and the image decoding units 104. Accordingly, with the present embodiment, it is possible to achieve a reduction of delay in decoding processing while using an image decoding apparatus that has a processing performance of the same degree as the conventional technique.

Configuration of Image Encoding Apparatus

Hereinafter, a configuration of the image encoding apparatus 2 that outputs an input stream that satisfies the above-described restricting conditions will be described.

Configuration of Image Encoding Apparatus

Figure 4:
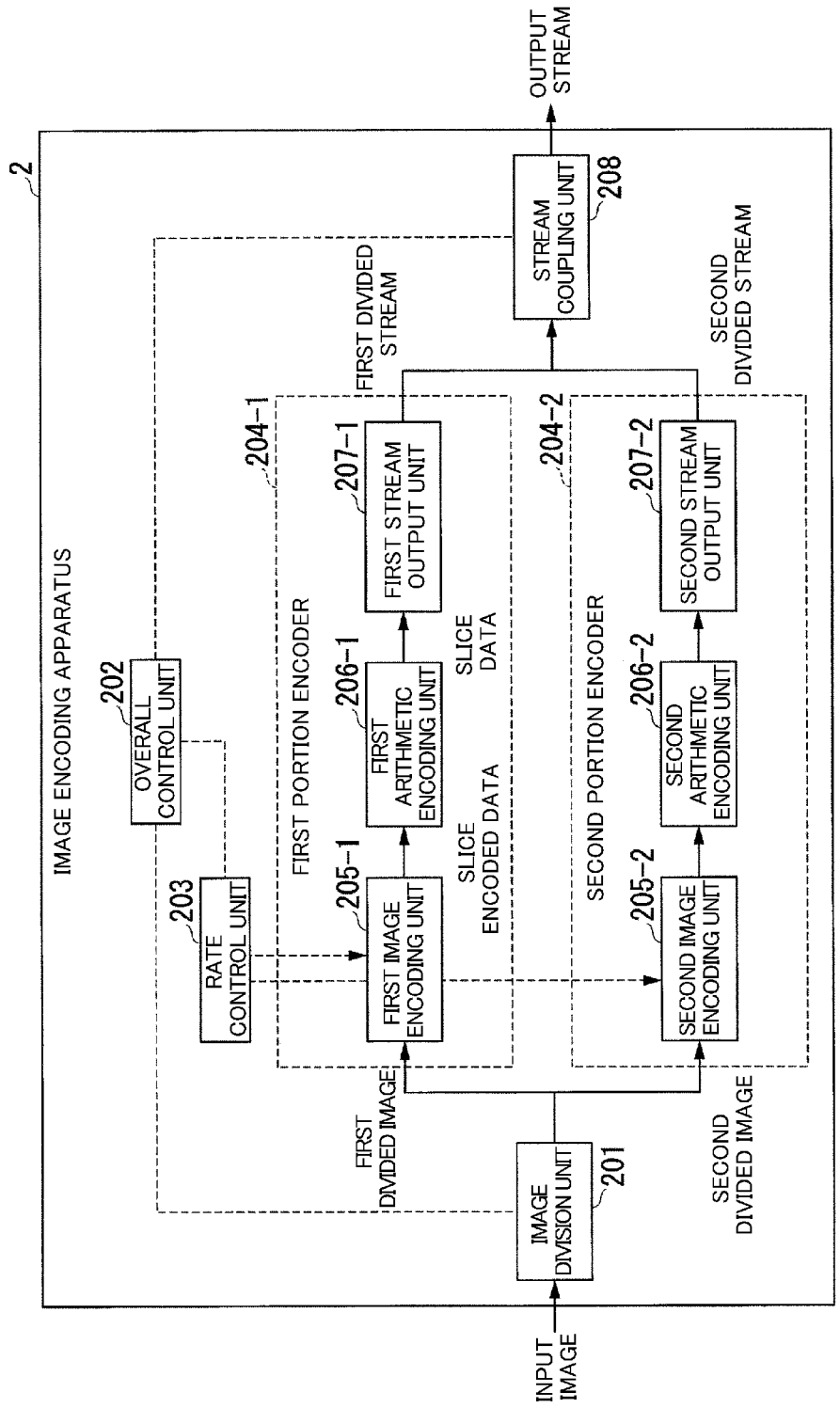
FIG. 4 is a block diagram showing a functional configuration of an image encoding apparatus 2 according to the first embodiment of the present invention.

FIG. 4 is a block diagram showing a functional configuration of an image encoding apparatus 2 according to the first embodiment of the present invention. As shown in FIG. 4, the image encoding apparatus 2 is constituted by including an image division unit 201, an overall control unit 202, a rate control unit 203, a first portion encoder 204-1, a second portion encoder 204-2, and a stream coupling unit 208. Also, the first portion encoder 204-1 is constituted by including a first image encoding unit 205-1, a first arithmetic encoding unit 206-1, and a first stream output unit 207-1. Also, the second portion encoder 204-2 is constituted by including a second image encoding unit 205-2, a second arithmetic encoding unit 206-2, and a second stream output unit 207-2.

Note that in the following description, if it is not necessary to distinguish between the first portion encoder 204-1 and the second portion encoder 204-2, they will be referred to as "portion encoders 204". Also, in the following description, if it is not necessary to distinguish between the first image encoding unit 205-1 and the second image encoding unit 205-2, they will be referred to as "image encoding units 205".

Also, in the following description, if it is not necessary to distinguish between the first arithmetic encoding unit 206-1 and the second arithmetic encoding unit 206-2, they will be referred to as "arithmetic encoding units 206". Also, in the following description, if it is not necessary to distinguish between the first stream output unit 207-1 and the second stream output unit 207-2, they will be referred to as "stream output units 207".

As shown in FIG. 4, the image encoding apparatus 2 includes two portion encoders 204. An input image is divided by an image division unit 201 into two partial images (a first divided image and a second divided image) that are in a spatially vertical positional relationship. The first divided image and the second divided image are input into the first portion encoder 204-1 and the second portion encoder 204-2 respectively. In the respective portion encoders 204, the first divided image or the second divided image is encoded into slice encoded data by the image encoding units 205, is further encoded into slice data by the arithmetic encoding units 206, and is output as a first divided stream or a second divided stream by the stream output unit 207. The stream coupling unit 208 couples the two partial streams (the first divided stream and the second divided stream above) in the vertical positional relationship and outputs them as one output stream.

The overall control unit 202 controls the image encoding unit 205 and the arithmetic encoding unit 206 so as to satisfy a restriction (the first condition above) relating to slice division in the image decoding apparatus 1, regarding the division size of the slices. For example, if the image encoding apparatus 2 encodes a 4K image of 3840×2160 pixels, each image is divided into 18 slices as shown in FIG. 2, and encoding is performed. As shown in FIG. 2, slice #8 and slice #17 are each composed of one encoding block line, and the remaining 16 slices are each constituted by two encoding block lines. The first image encoding unit 205-1 and the first arithmetic encoding unit 206-1 sequentially perform encoding processing on slice #0 to slice #8. At the same time, the second image encoding unit 205-2 and the second arithmetic encoding unit 206-2 sequentially perform encoding processing on slice #9 to slice #17.

If the slice size is small, this leads to a reduction in the stability of encoding efficiency and code amount control, whereas if the slice size is large, this leads to an increase in delay in the encoding processing and delay in the decoding processing. For this reason, in the present embodiment, a configuration is used in which balance is achieved, and division is performed to a slice size of one encoding block line or two encoding block lines. Also, slices composed of one encoding block line are spaced 9 slices apart from each other, and the number of encoding block lines included in any six consecutive slices is 11 or 12. In this manner, due to the difference in the number of encoding block lines being at most 1, the waiting time in the arithmetic decoding units 103 of the image decoding apparatus 1 is suppressed to the lowest limit.

The rate control unit 203 determines quantization parameters applied to the respective image encoding units 205 such that the code amount of the slice data satisfies the restriction (the second condition above) relating to the generated code amount of the image decoding apparatus 1. In the case of the above-described slice division size, the rate control unit 203 controls the code amount of each slice such that a buffer occupancy amounts before and after encoding of each slice satisfies a CPB size Bmax indicated in the following Formula (3).

$$B\max = 2/34 * R'\max/P \qquad (3)$$

Here, R'max indicates the maximum bit rate at which the image decoding apparatus 1 can perform decoding through parallel processing of the arithmetic decoding units 103 in the present slice division pattern. Also, 2/34*R'max/P indicates the maximum slice data code amount for which one arithmetic decoding unit 103 can complete the decoding of one slice up to the start time of arithmetic decoding of a subsequent slice.

By performing buffer control in units of slices at the above-described CPB size, the arithmetic decoding units 103 of the image decoding apparatus 1 can complete the arithmetic decoding processing within a predetermined amount of time. This makes it possible for the arithmetic decoding units 103 to efficiently perform parallel processing of arithmetic decoding processing in units of slices.

In actuality, in order for the arithmetic decoding units 103 to complete the arithmetic decoding processing within the predetermined amount of time, the code amount of all of the slices need only be less than the CPB size Bmax indicated in Formula (3) above.

For this reason, if the same condition is satisfied, it is also possible to set the CPB size to a smaller value or a larger value, but in the present embodiment, the same value is used for the sake of simplicity.

If the encoding bit rate is R'max, it is necessary to control the streams of the size of two encoding block lines such that they fall within an approximately uniform code amount, but if the encoding bit rate is low, there may also be borrowing and lending of code amounts between slices.

Also, in the present embodiment, slice #0 to slice #8 and slice #9 to slice #17 are encoded in parallel. For this reason, in order to achieve the above-described code amount control, for example, the CPB occupancy amount at the encoding start time for slice #9 need only be provisionally determined to be Bmax/2 or the like, and the code amounts of slice #0 to slice #8 need only be controlled such that the occupancy amount at the encoding end time of slice #8 is definitely greater than Bmax/2.

In the present embodiment, the image encoding apparatus 2 operates such that reference images that are adjacent to a boundary are mutually transferred up to a certain vertical width (e.g., 128 pixels) between the two portion encoders 204 and motion compensation of a certain degree can be performed also on motion between two divided images. This is similar to the definition with respect to the 8K image stream defined in ARIB STD-B32, and is a method that is commonly used in parallel encoding. In the case of this kind of configuration of the encoding apparatus, the restriction (the third condition above) relating to the reference range for motion compensation on the decoding apparatus side is guaranteed to be satisfied.

The stream output unit 207 adds the value of the delay reduction flag to the user data region or the unused region with respect to the slice data input by the arithmetic encoding unit 206 and outputs the result to the stream coupling unit 208 as a first divided stream and a second divided stream. Also, the information that is normally used, such as DTS of MPEG-2 TS, for example, need only be used as the information for reproduction of the decoding start time and the reference time.

With the above-described configuration, the image encoding apparatus 2 can generate a stream on which reduced-delay decoding processing can be performed by the above-described image decoding apparatus 1.

Operations of Image Decoding Apparatus

Hereinafter, an example of operations of the overall control unit 102 of the image decoding apparatus 1 will be described.

Figure 5:
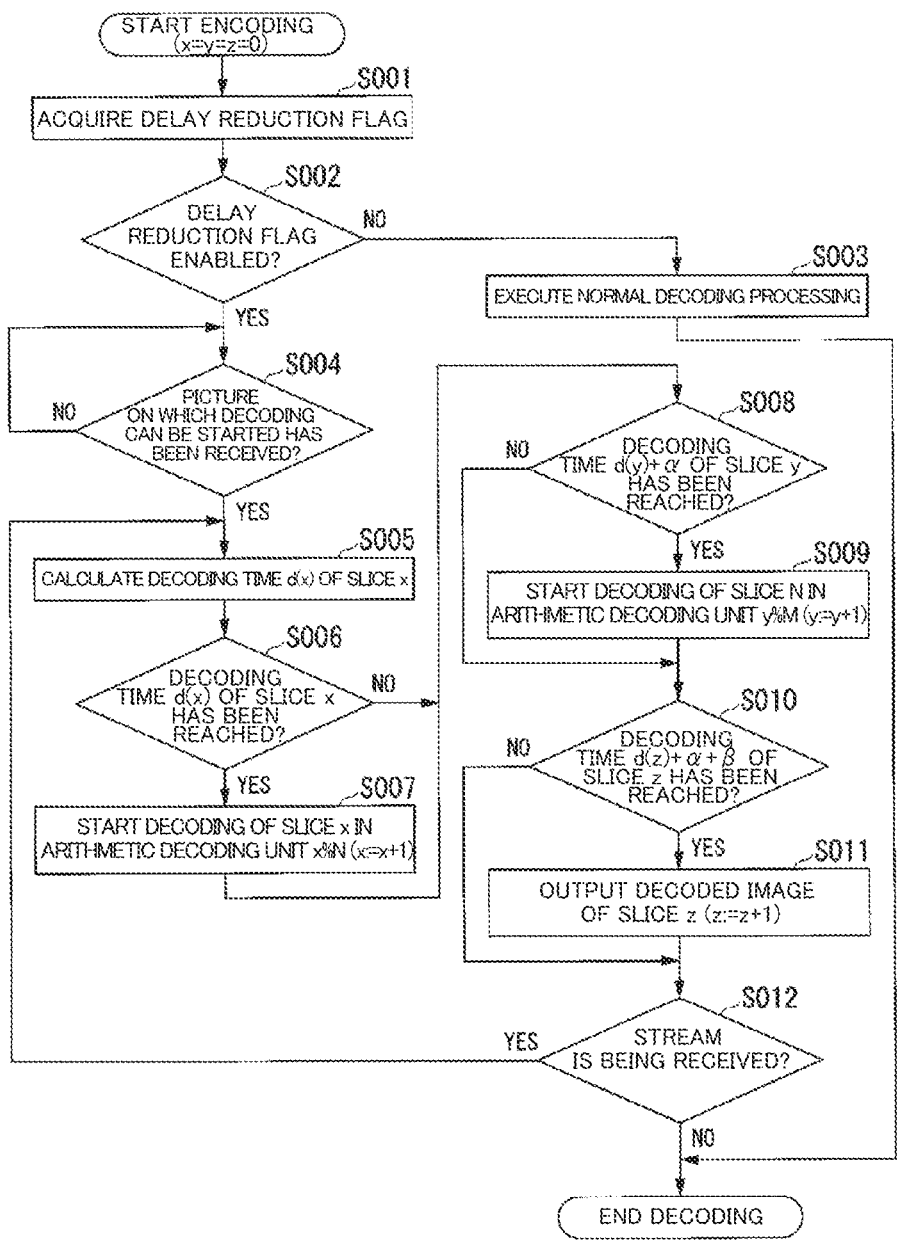
FIG. 5 is a flowchart showing operations of the image decoding apparatus 1 according to the first embodiment of the present invention.
Figure 6:
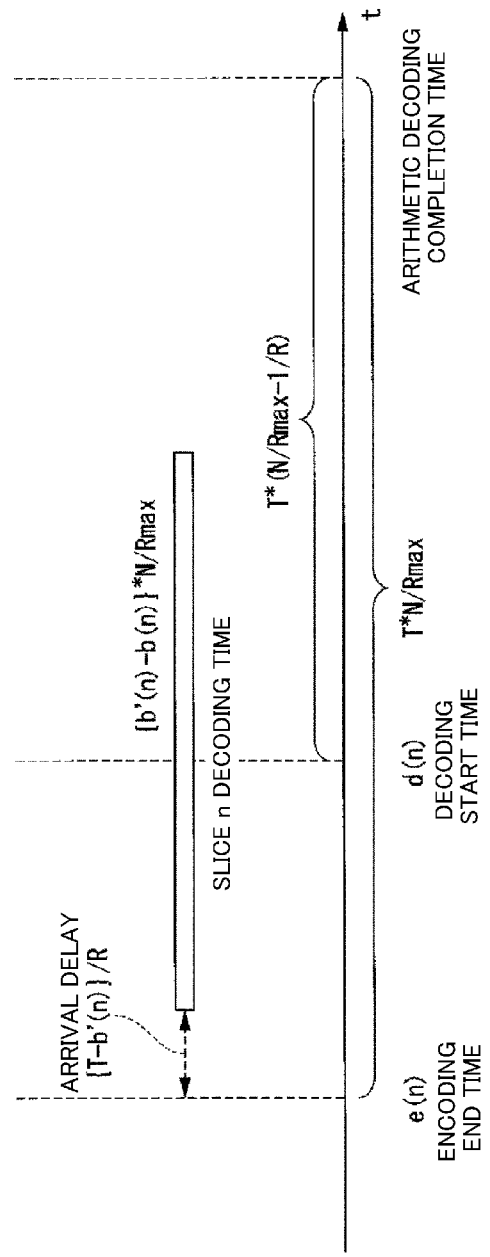
FIG. 6 shows an example of execution timing of arithmetic decoding processing and image decoding processing in a second embodiment of the present invention.

FIG. 5 is a flowchart showing operations of the overall control unit 102 of the image decoding apparatus 1 according to the first embodiment of the present invention. Note that the stream input unit 101, the arithmetic decoding unit 103, the image decoding unit 104, and the image output unit 106 operate separately in parallel, and description of the operation steps of the function blocks is omitted.

First, decoding processing is started by the overall control unit 102 initializing each of the internal parameters x, y, and z to 0. The overall control unit 102 acquires the value of the delay reduction flag described in the user data region or the unused region of the input stream (step S001). The overall control unit 102 determines whether the delay reduction flag is enabled or disabled. If the delay reduction flag is disabled (NO in step S002), the overall control unit 102 executes the normal (without reduced delay) decoding processing (step S003). Thereafter, the operation of the overall control unit 102 shown in the flowchart of FIG. 5 ends.

On the other hand, if the delay reduction flag is enabled (YES in step S002), the overall control unit 102 waits for reception of an image on which decoding can be started. If an image on which decoding can be started has not been received (NO in step S004), the overall control unit 102 continues to wait for reception of an image on which decoding can be started.

On the other hand, if an image on which decoding can be started has been received (YES in step S004), the overall control unit 102 calculates the decoding time d(x) of the slice x, which is the x-th slice from the start of decoding shown in Formula (4) below (step S005).

$$d(x) = D(x) + 1/L/P \qquad (4)$$

Here, P indicates the frame rate (frames/second). Also, L indicates the number of encoding block lines per image. Also, l (l=0 to L−1) indicates the head encoding block line of the slice. Also, D(x) indicates the decoding time of the image to which the slice belongs.

If the decoding time d(x) of the slice x has been reached (YES in step S006), the overall control unit 102 causes the x % N-th arithmetic decoding unit 103 (e.g., if x=1 and N=6, the first arithmetic decoding unit 103-1) to start the arithmetic decoding processing on the slice x. Here, N is the number of parallel arithmetic decoding units 103. Also, for the subsequent processing, the overall control unit 102 adds 1 to x (step S007). On the other hand, if the decoding time d(x) of the slice x has not been reached (NO in step S006), the overall control unit 102 does nothing.

Next, if the decoding time d(y)+α of the slice y has been reached (YES in step S008), the overall control unit 102 causes the y % M-th image decoding unit 104 (e.g., if y=1 and M=8, the first image decoding unit 104-1) to start the image decoding processing on the slice y. Here, α is a constant, and M is the number of parallel image decoding units. Also, for the subsequent processing, the overall control unit 102 adds 1 to y (step S009). On the other hand, if the decoding time $d(y)+\alpha$ of the slice y has not been reached (NO in step S008), the overall control unit 102 does nothing.

Next, if the decoding time $d(z)+\alpha+\beta$ of the slice z has been reached (YES in step S010), the overall control unit 102 causes the image output unit 106 to output the decoded image of the slice z. Here, $\beta$ is a constant. Also, for the subsequent processing, the overall control unit 102 adds 1 to z (step S011). On the other hand, if the decoding time $d(z)+\alpha+\beta$ of the slice z has not been reached (NO in step S010), the overall control unit 102 does nothing.

The overall control unit 102 determines whether or not a stream is continuously being received. If it is determined that the stream is continuously being received (YES in step S012), the overall control unit 102 repeats the processing of step S005 and onward. If it is determined that the stream is not continuously being received (NO in step S012), the overall control unit 102 ends the decoding processing. Thereafter, the operation of the overall control unit 102 shown in the flowchart of FIG. 5 ends.

Second Embodiment

In a second embodiment, unlike the first embodiment, after each slice n is received, if processing is possible, the corresponding arithmetic decoding unit 103 starts the arithmetic decoding processing without waiting for the decoding start time d(n).

In particular, in the condition that the encoding bit rate R is the maximum throughput Rmax/N of each arithmetic decoding unit 103 or more, the start time of the image decoding processing is determined to be $d(n)+T*(N/Rmax-1/R)+\gamma$ for a stream subjected to CPB control in units of slices with a CPB size T, which is less than the upper limit code amount Tmax of the image decoding apparatus 1. Here, $\gamma$ indicates an adjustable parameter. Accordingly, with the second embodiment, it is possible to achieve a further reduction of delay.

In the first embodiment, the decoding start time d(n) of the slice n is expressed by Formula (5) below.

$$d(n)=e(n)+T/R \qquad (5)$$

Here, e(n) indicates the encoding end time. Also, T/R indicates a fixed delay resulting from the CPB.

On the other hand, in the second embodiment, the arithmetic decoding unit 103 starts the arithmetic decoding processing at the time $e(n)+[T-b'(n)]/R$ immediately after the acquisition of the head portion of the slice, without waiting for the fixed delay resulting from the CPB. Here, b'(n) is the CPB occupancy amount prior to the encoding of slice n. Letting b(n) be the CPB occupancy amount after the encoding of slice n, the time at which the arithmetic decoding processing ends is $e(n)+\{T-b'(n)\}/R+\{b'(n)-b(n)\}*N/Rmax$. Due to the fact that this is a value that is less than or equal to $e(n)+\{T-b(n)\}*N/Rmax$ and is a value that is less than or equal to $e(n)+T*N/Rmax$, by substituting $e(n)=d(n)-T/R$, it is possible to estimate that the completion time of the arithmetic decoding processing is $d(n)+T*(N/Rmax-1/R)$ or less.

As described above, the image decoding apparatus 1 according to the above-described embodiment performs decoding processing in parallel on multiple slices composed of at least one encoding block line using the N arithmetic decoding units 103 and the M image decoding units 104. The N arithmetic decoding units 103 start the arithmetic decoding processing in sequence at time intervals corresponding to slice sizes on a stream that satisfies the condition that the difference between the sum of the number of encoding block lines included in any N consecutive slices and the sum of the number of encoding block lines included in N consecutive slices that are different from the any N consecutive slices is 1 or less, and the condition that the code amount of each slice is less than a predetermined upper limit code amount.

Also, as described above, the image encoding apparatus 2 according to the above-described embodiment generates an output stream that is encoded so as to satisfy at least the first condition and the second condition among the first condition, the second condition, and the third condition, and adds a delay reduction flag indicating that at least the first condition and the second condition are satisfied in the output stream. Here, the first condition is that the difference between the total number of encoding block lines included in any N consecutive slices and the total number of encoding block lines included in N consecutive slices that are different from the any N consecutive slices is 1 or less. The second condition is that the code amount of each slice is less than a predetermined upper limit code amount. The third condition is that, in inter-encoding of an X-th encoding block line from the upper end of an image, the (M−X)-th encoding block line from the lower end of a reference image, which is an image that was encoded immediately previously, is not referenced.

Due to the image decoding apparatus 1 and the image encoding apparatus 2 having the above-described configurations, if predetermined conditions (restricting conditions) are shared on the encoding side and the decoding side and the stream that is to be encoded and decoded satisfies the predetermined conditions, the stream is divided in, for example, the slice division pattern shown in FIG. 2. Accordingly, since the arithmetic decoding processing and the image decoding processing can be performed in parallel on the decoding side, the image decoding apparatus 1 and the image encoding apparatus 2 according to the above-described embodiment can reduce delay in the decoding processing.

A portion or all of the image decoding apparatus 1 and the image encoding apparatus 2 according to the above-described embodiment may also be realized using a computer. In this case, they may be realized by recording a program for realizing this function in a computer-readable storage medium, loading the program recorded in the storage medium to a computer system, and executing the loaded program. Note that a "computer system" in this context is assumed to include an OS and hardware such as peripheral devices. Also, a "computer-readable storage medium" refers to a storage device such as a flexible disk, a magneto-optical disk, a ROM, a transportable medium such as a CD-ROM, or a hard disk built in a computer system. Furthermore, a "computer-readable recording medium" may also encompass a recording medium that dynamically stores a program for a short amount of time, such as a communication wire used when transmitting a program via a network such as the Internet or a communication line such as a telephone line, and a recording medium that stores a program for a certain amount of time, such as a volatile memory in a computer system serving as a server or a client in this case. The above-described program may also be for realizing some of the above-described functions, may be able to realize the above-described functions in combination with a program that has already been recorded in the computer system, and may also be realized using hardware such as a PLD (Programmable Logic Device) or an FPGA (Field Programmable Gate Array).

Although embodiments of the present invention were described above with reference to the drawings, it is clear that the above-described embodiments are merely exemplary illustrations of the present invention and the present invention is not limited to the above-described embodiments. Accordingly, constituent elements may also be added, omitted, replaced, and otherwise modified without departing from the technical idea and gist of the present invention.

REFERENCE SIGNS LIST

1 Image decoding apparatus
2 Image encoding apparatus
101 Stream input unit
102 Overall control unit
103 Arithmetic decoding unit
104 Image decoding unit
105 Reference image buffer
106 Image output unit
201 Image division unit
202 Overall control unit
203 Rate control unit
204 Portion encoder
205 Image encoding unit
206 Arithmetic encoding unit
207 Stream output unit
208 Stream coupling unit

The invention claimed is:

1. A decoding apparatus comprising:
a stream input unit configured to obtain, from an encoder, an image stream that comprises a plurality of slices, each slice being composed of at least one encoding block line;
a control unit configured to determine a presence or an absence of a delay reduction flag in the obtained image stream;
based on determining the presence of the delay reduction flag, the stream input unit is configured to determine a decoding start time of each slice of the plurality of slices, the decoding start time determined using (i) a frame rate of the image stream, (ii) a number of encoding block lines per image in the image stream, and (iii) a decoding time of each image in the image stream;
in response to determining the decoding start time for a respective slice has been reached, a plurality of arithmetic decoding units and a plurality of image decoding units are configured to perform arithmetic decoding processing on the respective slice in a predetermined order of each arithmetic decoding unit, wherein a respective arithmetic decoding unit is configured to initiate decoding of a respective slice at time intervals corresponding to slice sizes on the image stream that satisfy conditions of:
a difference between (i) a total number of encoding block lines included in N consecutive slices and (ii) a total number of encoding block lines included in another set of N consecutive slices is 1 or less, and an amount of code that is controlled for processing the respective slice is within a predetermined upper limit code amount.

2. The decoding apparatus according to claim 1, wherein in response to acquiring head portions of each of the slices, the arithmetic decoding units are configured to start the arithmetic decoding processing on the image stream resulting from performing code amount control in units of each of the slices on an image stored in a buffer of a size that is the same as the predetermined upper limit code amount.

3. The decoding apparatus according to claim 1, wherein the control unit is configured to, according to the size of the predetermined upper limit code amount, determine an amount of time from a start time of the arithmetic decoding processing of a first slice in the image stream to a start time of image decoding processing of a first encoding block line of the first slice.

4. The decoding apparatus according to claim 1, wherein if a condition that, in inter-encoding of an X-th encoding block line from an upper edge of a splice of the obtained image stream, an (M–X)-th encoding block line from a lower edge of a previous slice that was encoded immediately previously is not referenced is satisfied, wherein the decoding apparatus further comprises:
the plurality of image decoding units are configured to perform image decoding processing in sequence at a predetermined time interval on the encoding block lines in response to the arithmetic decoding processing performed by the plurality of arithmetic decoding units.

5. An encoding apparatus comprising:
an image division unit configured to (i) obtain an input image and (ii) divide the input image into a first image and a second image;
a first encoder configured to (i) receive the first image and (ii) generate a first plurality of slices of the first image;
a second encoder configured to (i) receive the second image and (ii) generate a second plurality of slices of the second image;
a control unit configured to control an image encoding unit and an arithmetic encoding unit in the first encoder and the second encoder so as to satisfy at least a first condition and a second condition,
wherein the first condition comprises a difference between a total number of encoding block lines included in any N consecutive slices and a total number of encoding block lines included in N consecutive slices different from the any N consecutive slices is 1 or less,
wherein the second condition comprises a code amount of each slice is less than a predetermined upper limit code amount; and
a stream coupling unit configured to (i) generate a stream by combining the first plurality of slices and the second plurality of slices, (ii) to add a delay reduction flag indicating that at least the first condition and the second condition are satisfied in the generated stream, and (iii) output the generated stream to an encoder, wherein a decoding start time is determined using (i) a frame rate of the image stream, (ii) a number of encoding block lines per image in the image stream, and (iii) a decoding time of each image in the image stream.

6. A decoding method for performing decoding processing in parallel, the method comprising:
obtaining, from an encoder, an image stream that comprises a plurality of slices, each slice being composed of at least one encoding block line;
determining a presence or an absence of a delay reduction flag in the obtained image stream;
based on determining the presence of the delay reduction flag, determining a decoding start time of each slice of the plurality of slices, the decoding start time determined using (i) a frame rate of the image stream, (ii) a number of encoding block lines per image in the image stream, and (iii) a decoding time of each image in the image stream;

in response to determining the decoding start time for a respective slice has been reached, performing, using a plurality of arithmetic decoding units and a plurality of image decoding units, arithmetic decoding processing on the respective slice in a predetermined order of each arithmetic decoding unit, wherein the arithmetic decoding process initiates decoding of a respective slice at time intervals corresponding to slice sizes on the image stream that satisfy conditions of:

a difference between (i) a total number of encoding block lines included in N consecutive slices and (ii) a total number of encoding block lines included in another set of N consecutive slices is 1 or less, and (ii) an amount of code that is controlled for processing the respective slice is within a predetermined upper limit code amount.

7. The decoding apparatus of claim 1, wherein the encoding block line comprises a vertical width of pixels and a horizontal width of pixels.

8. The encoding apparatus of claim 5, wherein the encoding block line comprises a vertical width of pixels and a horizontal width of pixels.

9. The encoding apparatus of claim 5, wherein the control unit is configured to determine quantization parameters to apply to the image encoding unit of each of the first encoder and the second encoder to satisfy the second condition.

* * * * *